United States Patent
Wojcik et al.

[11] Patent Number: 6,031,560
[45] Date of Patent: *Feb. 29, 2000

[54] HIGH RESOLUTION MEDICAL DIAGNOSTIC LASER PRINTER

[75] Inventors: Timothy John Wojcik; Robert Thompson Krogstad, both of Rochester, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/633,257

[22] Filed: Apr. 18, 1996

[51] Int. Cl.[7] .................................................. B41J 2/47
[52] U.S. Cl. ..................... 347/254; 347/131; 347/251; 347/252; 358/428; 358/451; 358/298
[58] Field of Search ..................... 347/131, 251, 347/252, 253, 254; 358/298, 428, 451, 453

[56] References Cited

U.S. PATENT DOCUMENTS

| | | | |
|---|---|---|---|
| 4,366,508 | 12/1982 | Crean et al. | 358/451 |
| 4,578,689 | 3/1986 | Spencer et al. | 347/129 |
| 5,111,044 | 5/1992 | Agano | 358/453 |
| 5,157,417 | 10/1992 | Anzai | 347/251 |
| 5,239,313 | 8/1993 | Marko et al. | 347/132 |
| 5,321,432 | 6/1994 | Ishikawa et al. | 347/131 |
| 5,323,183 | 6/1994 | Tateoka et al. | 347/254 |
| 5,361,329 | 11/1994 | Morita et al. | 395/102 |

FOREIGN PATENT DOCUMENTS

| | | | |
|---|---|---|---|
| 1-171946 | 7/1989 | Japan | B41J 3/00 |
| 9210052 | 6/1992 | WIPO | |
| 9607268 | 3/1996 | WIPO | |

*Primary Examiner*—N. Le
*Assistant Examiner*—Hai C. Pham
*Attorney, Agent, or Firm*—William F. Noval

[57] ABSTRACT

A high resolution continuous tone medical image printer is capable of printing a high resolution image on a plurality of different sized media. In a normal resolution mode, a medical image of m×n pixels is printed on a first sized media with a variable pixel clock operating at a first pixel clock rate, and in a second resolution mode where the medical image of m×n pixels is printed on a second sized media larger than the first sized media in either or both the line scan direction and the page scan direction, the pixel clock is operated at a pixel clock rate less than the first pixel clock rate such that m pixels are printed per line with the pixel size being larger in the line scan direction and such that lines of pixels are added so that more than n lines of pixels are printed in the page scan direction and such that the beam of light size, the scanner speed and the page scan speed are held constant no matter what sized media is being printed.

8 Claims, 3 Drawing Sheets

| MEDIA SIZE | PIXEL MATRIX | PIXEL CLOCK |
|---|---|---|
| 8" X 10" | 4K X 5K | 6.4 MHz |
| 11" X 14" | 4K X 7.5K | 4.4 MHz |
| 14" X 14" | 4K X 7.5K | 3.5 MHz |
| 14" X 17" | 4K X 9.5K | 3.5 MHz |

HIGH RESOLUTION MEDICAL DIAGNOSTIC LASER PRINTER

FIELD OF THE INVENTION

The present invention relates generally to a continuous tone medical laser printer, and more specifically relates to a continuous tone medical laser printer capable of printing a high resolution image on media of varying sizes.

BACKGROUND OF THE INVENTION

Continuous tone laser printers are used in medical diagnostic imaging applications to produce digital images on media, such as film, from image signals representing medical images. The laser printers are used with apparatus that provide image signals, such as computerized axial tomography, magnetic resonance, ultrasound and digital subtraction angiography.

The printers typically print picture elements, or pixels, on media of various sizes such as 8×10, 11×14, 14×14, and 14×17 inch, with a fixed pixel pitch, where pixel pitch is defined as the distance from midpoint of one pixel to the midpoint of the next adjacent pixel. The fixed pixel pitch is generally chosen such that 4096×5120 image pixels are printed or exposed on 14×17 inch media, with fewer pixels printed on smaller media sizes using the same pixel pitch. An example of the number of image pixels that can be printed on media of various sizes with the typical fixed pixel pitch of 80 microns, follows:

| Media Size | Image Pixels |
|---|---|
| 8 × 10 inch | 2300 × 2900 |
| 11 × 14 inch | 3232 × 4696 |
| 14 × 14 inch | 4096 × 4096 |
| 14 × 17 inch | 4096 × 5120 |

Standard printer memory and image processing capabilities are designed to support a maximum of 4096×5120 pixels. Standard laser spot size is designed to compliment pixel pitch and maximize image quality and is generally twice the pitch of the pixels in the page or y-direction, and equal to the pixel pitch in the line or x-direction.

Typically, image signals provided from various medical apparatus will have an insufficient number of image pixels to fill the complete page on the desired size of media. In this situation interpolation is required to produce an image with a larger number of pixels. A variety of interpolation techniques have been used to achieve this. These interpolation techniques are well known to those skilled in the art and include replication, cubic convolution and bilinear interpolation. In replication a previous pixel value is repeated, forming a new pixel. In cubic convolution, a weighted sum is calculated from the two previous and two following rows as well as the two pixels to the right and left of the pixel being added (a 4×4 array). In bilinear interpolation the value of the created pixel is a weighted average of the four nearest pixels.

PROBLEMS TO BE SOLVED BY THE INVENTION

New technology is emerging for high resolution digital capture of medical images, for applications such as mammography. This new technology requires, for example, the printing of images with 4096×5120 pixels on 8×10 inch media. A laser printer with a smaller pixel pitch (e.g. 43 micron) can be built to meet this need. However, reducing the pixel pitch for a printer that is also capable of printing on larger media sizes would require internal electronics supporting much larger image data structures, thus increasing manufacturing costs dramatically. This also requires increasing the memory capacity for storing the image data and the interpolated image.

It is thus desirable to have a laser printer capable of printing with a variable pixel pitch such that the high resolution printing can be achieved without significantly affecting the cost of the laser printer electronics. This type of laser printer would print 4096×5120 pixels on any of 8×10, 11×14, and 14×17 inch media. Such variable pixel pitch printers can be achieved through complex optical schemes that adjust the laser beam spot size, line (x-direction) scanning velocity, and media (y-direction) velocity. However, this again drives up manufacturing costs significantly. In particular, achieving variable line scanning velocity with a polygon laser beam deflector is complex and costly. Varying line scan velocity or media scan velocity affects exposure time and consequently density calibration. The apparatus disclosed in the following patents have one or more of these problems.

U.S. Pat. No. 4,366,508 discloses the use of a variable line pixel clock with variable slow scan transport speed.

U.S. Pat. No. 5,321,432 discloses image forming apparatus with resolution control in the line direction by changing the pixel clock and in the page direction by skipping alternate lines for lower resolution.

U.S. Pat. No. 5,114,044 discloses setting print resolution based on input resolution I.D. signal by (1) varying pixel clock and slow scan speed, or (2) varying pixel clock and polygon speed.

U.S. Pat. No. 5,239,313 discloses a continuously variable printer by varying spot size, slow scan speed, pixel clock and polygon speed.

U.S. Pat. No. 4,578,689 discloses a dual mode printer using pixel clock and slow scan change and laser power change.

SUMMARY OF THE INVENTION

According to the present invention there is provides a solution to the problems discussed above. According to a feature of the invention there is provided a high quality, continuous tone medical image printer in which a fixed number of pixels can be printed on various media sizes without significant added cost to a normal medical printer. In general, a constant speed media drive is used which transports media at a rate which, with a constant line printing rate as determined by a polygon beam deflector running at a constant speed, produces a fixed page direction pixel pitch as required by the high resolution application. The page direction spot size is chosen to optimize image quality with respect to resolution and raster visibility. The image pixels in the page direction are produced in a variable fashion by adjusting the interpolation factor to the media size in the page scan direction.

According to another feature of the present invention, in the line scan direction, the pixel pitch is varied by varying the pixel clock. The spot size can be held constant because the modulation transfer function in the line direction is driven more by spot velocity and pixel exposure rise and fall times than by spot size.

According to a specific feature of the present invention, there is provided a high resolution medical image printer for printing a high resolution medical image on at least first and second different sized media, comprising:

a memory for storing a medical image including a page of m×n pixels, wherein m equals the number of pixels per line and n equals the number of lines in a page;

a source of a beam of light which is modulated by said pixels;

a media drive for driving a media in a page direction at a constant page scan speed;

a scanner for scanning said modulated beam of light in a line direction perpendicular to said page direction at a constant line scan speed;

a variable pixel clock coupled to said source of a beam of light to vary the clock rate of each pixel;

an interpolator coupled between said memory and said source of a beam of light for increasing the number of lines of pixels printed on media; and a controller for controlling said variable pixel clock and said interpolator in at least a first mode wherein a medical image of m×n pixels stored in said memory is printed on a first sized media, such that said pixel clock is operated at a first pixel clock rate, and in a second mode wherein a medical image of m×n pixels stored in said memory is printed on a second sized media larger than said first sized media in either or both the line scan direction and the page scan direction, such that when the second sized media is larger in said line scan direction, said pixel clock is operated at a pixel clock rate that is less than said first pixel clock rate and a function of said media size in said line scan direction, but such that m pixels are printed per line, and such that when the second sized media is larger in the page scan direction, said interpolator adds lines of pixels so that more than n lines of pixels are printed in said page scan direction.

The invention has the following advantages, among others.

1. The laser spot size, polygon beam deflector speed, and media page scan drive speed can be held constant, thus reducing cost and equipment complexity.

2. The page store memory and interpolation line stores can be kept at a minimum level of complexity thus minimizing the manufacturing cost of the printer.

3. The complex and expensive optical variable pitch schemes are avoided, reducing manufacturing cost significantly.

4. The cost and complexity of using variable speed reflectors, variable speed media drivers, and or variable beam spot optics are eliminated.

5. Calibration maintained constant for different resolution/page size prints.

DETAILED DESCRIPTION OF THE EMBODIMENT(S)

Figure 1:
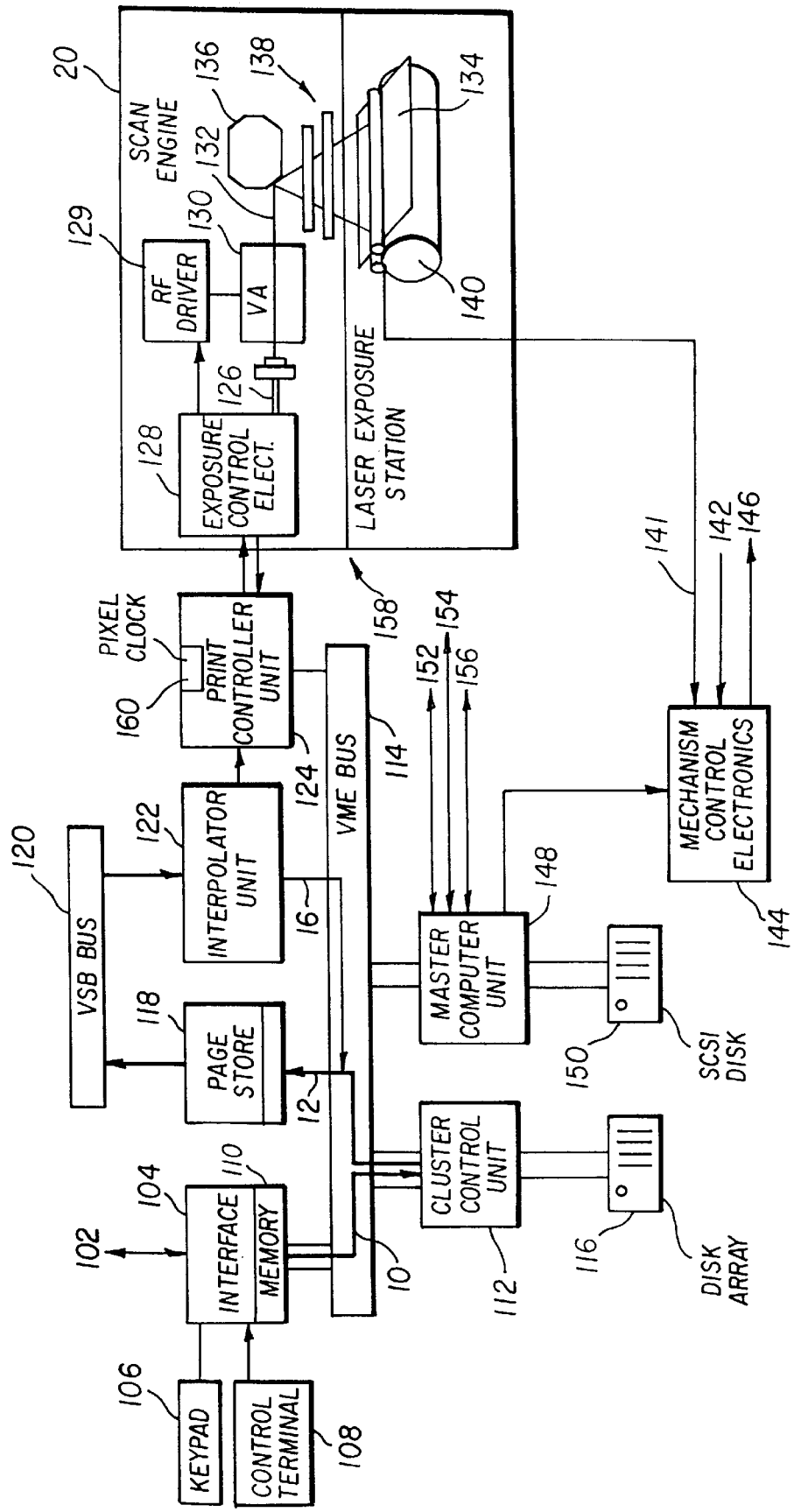
FIG. 1 is a block diagram of a laser printer in accordance with the present invention, capable of printing high resolution images.

FIG. 1 is a block diagram of a continuous tone, high resolution medical diagnostic laser printer of this invention. The laser printer is coupled to outside modalities which generate image signals 102, through interface 104, interface 104 also being coupled to keypad(s) 106, control terminal 108 and master computer unit 148. Interface 104 communicates with cluster control unit 112 by way of VME bus 114 (see path 10). Cluster control unit 112 is also coupled to disk array 116 and communicates with page store 118 by way of VME bus 114 (see path 12). Page store 118 communicates with interpolating unit 122 by way of VSB bus 120. Interpolator unit 122 is coupled to print controller unit 124. Print controller unit 124 is also coupled to laser exposure station 158. Laser exposure station 158 includes scan engine 20 for scanning pixels onto media 134, and media driver 140 which moves media 134, e.g., dry silver media. Scan engine 20 includes exposure control electronics 128, laser diode 126, variable attenuator 130, beam 132, rotating polygon reflector 136, reflector drive (not shown) and lens 138. Laser diode 126 emits beam 132, which is reflected by reflector 136 and focused by lens 138 onto media 134 while media 134 is moved at a predefined slow scan rate by media driver 140 which is rotated by motor 141. Page store 118, interpolating unit 122, print controller unit 124, deflector 136 and media driver 140 each communicate with master computer unit 148 via VME bus 114.

In this apparatus, interface 104 receives image signals 102 from various modalities such as computerized axial tomography, magnetic resonance, ultrasound and digital subtraction angiography, as well as from computed radiography scanners and film digitizers. These image signals may be in digital or analog form. Where the images are in analog form A–D circuitry in interface 104 digitizes the image signals. Operator commands are entered through interface 104 by way of keypad(s) 106, and control terminal 108. Operator commands may also be received by master computer unit 148 via input from operator panel 152 or CES terminal 156. The operator commands and image signals are either stored in memory 110, or transmitted to cluster control unit 112 through a system bus, preferably VME bus 114. The image signals and operator commands are then stored in non-volatile memory such as disk array 116, through cluster control unit 112. Each entire image stored in disk array 116 will be referred to as an original image. Master computer unit 148 controls the laser printer function responsive to these operator commands.

It may be desirable for a single print on media 134 to present a number of images. The particular layout of desired images is specified by the operator commands, which are received by master computer unit 148. Image signals corresponding to one or more original images are selectably retrieved through cluster control unit 112 by master computer unit 148 and sent via VME bus 114 to page store 118 where lines are formatted in a PAGE of image date. Page store 118 is addressable by master computer unit 148.

Figure 2:
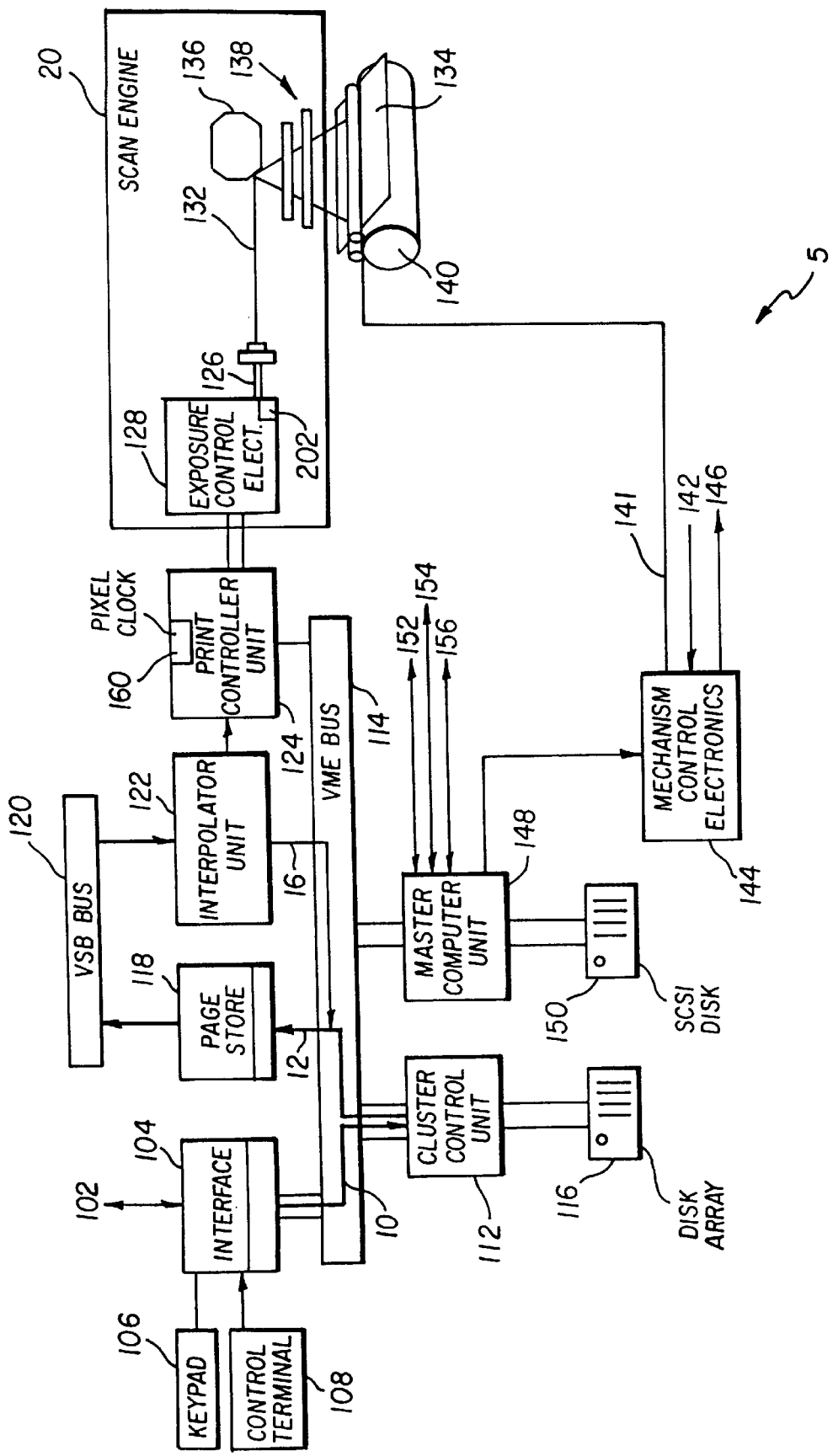
FIG. 2 depicts a block diagram of a laser printer, in accordance with another embodiment of the present invention.

FIG. 2 shows another embodiment of scan engine 20. In this embodiment, the level setting of beam 132 is adjusted by directly modulating the amplitude of beam 132 emitted from laser diode 126 through adjustments to amplifier/driver circuit 202 that is within exposure control electronics 128. Adjustments to amplifier/driver circuit 202 change the amount of current provided to laser diode 126 and thus change the level setting of beam 132. By controlling media 134 exposure with a modulating means such as variable attenuator 130 (see FIG. 1) or amplifier/driver circuit 202, each picture element or pixel can be modulated to differing levels, such as 4096 levels, thereby forming a continuous tone image.

Returning to FIG. 1, the timing pulse, or duration, of beam 132 is set by the rate of pixel clock(s) 160. In high resolution laser printing, necessary adjustments in the line scan or x-direction are made by selecting pixel clock(s) 160 rate, while maintaining a constant speed deflector 136. These adjustments affect the laser diode timing pulse; i.e. they affect the duration of emission of beam 132, thereby affecting the size of the final pixel on media 134 in the x-direction; that is, the horizontal pitch. When the timing pulse is increased the final pixel lengthens and vice versa. The varying level setting of each pixel is not altered. In a preferred embodiment the horizontal pixel pitch used with an 8×10 inch media is approximately 43 microns. In one embodiment pixel clock(s) 160 is a variable frequency oscillator with phase lock loop. In this embodiment the proper frequency is chosen by master computer unit 148 in response to operator command. In a second embodiment there are several fixed frequency pixel clocks within apparatus 5, each pixel clock having a specific frequency. The proper pixel clock is chosen by master computer unit 148 in response to operator commands. Desired pixel clock 160 frequency is related to media 134 size chosen. Referring to laser exposure station 158, beam 132 is directed at a predefined speed across media 134 in a line scan or x-direction by deflector 136 such as a rotating polygon deflector and is focused by lens 138. In a preferred embodiment lens 138 is an f-θ lens. Media driver 140 moves media 134 at a predefined slow scan speed in the page scan or y-direction. The slow scan speed is defined during apparatus 5 calibration to provide the desired vertical pitch of final pixels on media 134. The line scan speed across media 134 is also defined during apparatus 5 calibration such that adjustment of pixel clocks 160 will provide a desired horizontal pitch of the number of final pixels. In one embodiment media driver 140 is a motor coupled to pinch rollers for moving media at a selected speed. In a second embodiment media driver 140 is a motor coupled to a lead screw that translates a carrier stage for moving media 134 at a selected speed. As is well known by those skilled in the art, sensors 142 feed data from elements such as media driver 140 to mechanism control electronics 144, commands are sent back to actuators 146 thereby effecting desired changes in these elements.

Master control unit 148 is a digital microprocessor. An operating program stored in master control unit 148 controls the operation of apparatus 5. Specifically, interpolator unit 122 and print control unit 124 operate responsive to command signals received from master control unit 148 via VME bus 114. Master control unit 148 can also receive status signals from interpolator unit 122 and print control unit 124 and interface 104 to communicate their status. Scan engine 20 and media driver 140 are controlled by master computer unit 148 through mechanical control electronics 144 via signals from sensors 142 and signals to actuators 146 in laser exposure station 158 (sensors and actuators not shown in FIG. 1). In addition, master computer unit 148 effectuates high level commands and background diagnostics as well as providing a front end interface with the external world. System data for master computer unit 148 is stored in SCSI disk 150. In a preferred embodiment, serial I/O links allow for programming of apparatus 5 and interaction with other systems at operator panel 152, film processor 154 and CES terminal 156.

In varying embodiments, look up tables such as are well known to those skilled in the art, are used to calibrate signals at any point after the PAGE is formatted in page store 118. Look up tables may be a separate module, or may be integrated with any or all of page store 118, interpolator unit 122 or print control unit 124.

According to the present invention, there is provided a medical image laser printer that is operable in a high resolution mode and preferably also in a normal mode. In the normal mode the largest size image, such as a 4k×5k pixel image, is printed on the largest size media, for example 14×17 inch film media, which the printer can process. When the image is to be printed on smaller size media, such as 14×14 inch, 11×14 inch, or 8×10 inch, the number of pixels are reduced in either or both the line and page direction. A fixed pixel pitch is used no matter what size media is printed on. The pixel matrix may, for example be that shown in FIG. 3. As shown, for 14×17 inch media, the pixel matrix size is 4096×5126 pixels, for 14×14 inch media the pixel matrix size is 4096×4096 pixels, for 11×14 inch media, the pixel matrix size is 3232×4096 pixels, and for 8×10 inch media, the pixel matrix size is 2300×2900 pixels. The smaller sized images are processed from a larger sized image stored in page store 118 by well known image sizing processing techniques (e.g., interpolation, decimation, etc.) by interpolating unit 122. The image is printed onto media 134 by laser exposure station 158.

Figures 3, 4:
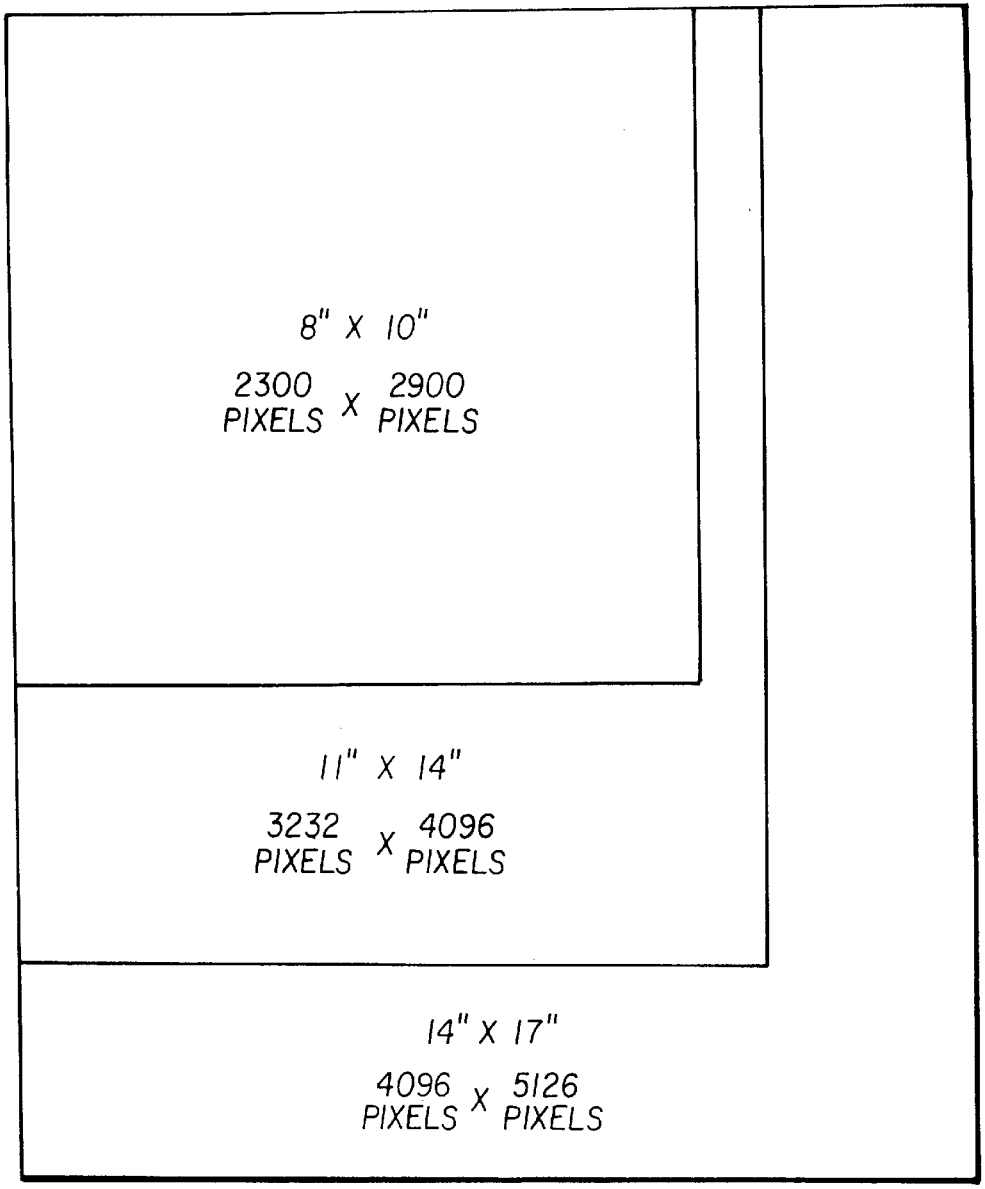
FIGS. 3 and 4 are diagrammatic views useful in explaining the present invention.

When the medical laser printer is operated in a high resolution mode, the largest size image is printed on the smallest size media, such as the 8×10 inch media. The same pixel matrix size image is printed on larger media by providing a variable rate pixel clock in the line direction in conjunction with image data interpolation in the page direction. In this mode, the laser spot size, the polygon reflector speed and the slow scan media drive speed are held constant no matter what size media is being printed on. Moreover, the page store can be kept at the same size when the printer is operated in either the normal or high resolution mode. Referring to FIG. 4, there is illustrated the operating parameters for exemplary media processed in the high resolution mode. As shown, the 4k×5k image is printed on the 8×10 media at a pixel clock rate of 6.4 MHz without any change in the image pixel matrix size. For larger media the image pixel matrix size is not changed in the line direction but is expanded in the page direction. Thus, for 11×14 media, 4k pixels are printed per line but at a pixel clock rate of 4.4 MHz, and 7.5k lines are printed in the page direction. For 14×14 media, the 4k pixels are printed per line at a pixel clock of 3.5 MHz and 7.5k lines are printed in a page direction. For 14×17 inch media, 4k pixels are printed per line at a pixel clock rate of 3.5 MHz and 9.5k lines are printed in the page direction. Referring to FIG. 1, the laser printer 5 is operated in the high resolution mode by controlling interpolator 122 to increase the number of lines when the media is larger in the page scan direction and by controlling pixel clock 160 to change the pixel clock rate when the media is larger in the line scan direction. In the latter case, the number of pixels printed per line are the same for different sized media, but the pixel clock rate is changed as a function of the media dimension in the line scan direction.

It will be understood that the specific pixel matrix size and the specific media sizes described above are for illustration purposes only, and that other pixel matrix sizes and other media sizes are within the scope of the invention. Other specific examples are exemplary only and it will be appreciated by those skilled in the art that the invention is not limited thereby.

Although the invention has been described in detail for the purpose of illustration, it is understood that such detail is solely for that purpose, and variations can be made therein by those skilled in the art without departing from the spirit and scope of the invention.

PARTS LIST

| | |
|---|---|
| 5 | Apparatus |
| 10 | Path |
| 12 | Path |
| 16 | Path |
| 20 | Scan Engine |
| 102 | Image Signals |
| 104 | Interface |
| 106 | Keypad(s) |
| 108 | Control Terminal |
| 110 | Memory |
| 112 | Cluster Control Unit |
| 114 | VME Bus |
| 116 | Disk Array |
| 118 | Page Store |
| 120 | VSB Bus |
| 122 | Interpolator Unit |
| 124 | Print Controller Unit |
| 126 | Laser Diode |
| 128 | Exposure Control Electronics |
| 129 | RF Driver |
| 130 | Variable Attenuator |
| 132 | Beam |
| 134 | Media |
| 136 | Deflector |
| 138 | Lens |
| 140 | Media Driver |
| 141 | Page Start Signal |
| 142 | Signals From Sensors |
| 144 | Mechanism Control Electronics |
| 146 | Signals To Actuators |
| 148 | Master Computer Unit |
| 150 | SCSI Disk |
| 152 | Operator Panel |
| 154 | Film Processor |
| 156 | CES Terminal |
| 158 | Laser Exposure Station |
| 160 | Pixel Clock(s) |
| 202 | Amplifier/Driver Circuit |

What is claimed is:

1. A high resolution continuous tone medical image printer for printing a high resolution medical image on at least first and second different sized media, comprising:

means for providing a digital medical image including a page of m×n pixels, wherein m equals the number of pixels per line, n equals the number of lines in a page, and each pixel has a pixel clock rate;

a source of a beam of light which is modulated by said pixels;

a media drive for driving a media in a page direction at a constant page scan speed;

a scanner for scanning said modulated beam of light in a line direction perpendicular to said page direction at a constant line scan speed;

a variable pixel clock coupled to said source of a beam of light to vary the clock rate of each pixel;

an interpolator coupled between said means for providing and said source of a beam of light for increasing the number of lines of pixels printed on media; and a controller for controlling said variable pixel clock and said interpolator in at least a first mode wherein a medical image of m×n pixels provided by said means for providing is printed on a first sized media, such that said pixel clock is operated at a first pixel clock rate, and in a second mode wherein a medical image of m×n pixels provided by said means for providing is printed on a second sized media larger than said first sized media in either or both the line scan direction and the page scan direction, such that when the second sized media is larger in said line scan direction, said pixel clock is operated at a pixel clock rate that is less than said first pixel clock rate and a function of said media size in said line scan direction, but such that m pixels are printed per line wherein the pixel size is larger in said line scan direction for said larger size media, and such that when the second sized media is larger in the page scan direction, said interpolator adds lines of pixels so that more than n lines of pixels are printed in said page scan direction and such that the beam of light size, the scanner speed, and said page scan speed are held constant no matter what size media is being printed.

2. The printer of claim 1 wherein said source of a beam of light is a laser.

3. The printer of claim 1 wherein said scanner is a polygon mirror scanner which is rotated at a constant speed.

4. The printer of claim 1 wherein said interpolator is embodied in a look-up table.

5. The printer of claim 1 wherein said means for providing is a medical imaging modality.

6. A medical image printer for printing both high resolution and normal resolution continuous tone images on at least first and second sized media, comprising:

means for providing a medical image including a page of m×n pixels, wherein m equals the number of pixels per line and n equals the number of lines in a page;

a print assembly for selectively printing said medical image including a page of m×n pixels onto first and second different sized media; and a controller for controlling said print assembly to selectively operate, a) in a normal resolution mode wherein a page of m×n pixels is printed on the larger of said first and second media, and a page of a smaller pixel size than said m×n pixel size is printed on the smaller of said media, and b) in a high resolution mode wherein a page of m×n pixels is printed on the smaller of said first and second media, and a page of m pixels per line at different pixel clock rate, and n+x lines are printed on said larger of said media wherein x is an integer number and wherein parameters for printing said media are held constant no matter what size media is being printed.

7. The printer of claim 6 wherein said print assembly includes a laser printer assembly.

8. The printer of claim 7 wherein said laser printer assembly includes a laser for producing a laser beam, a movable scanner for scanning said laser beam repeatedly in a line scan direction, and a media driver for moving media in a page direction perpendicular to said line scan direction, and wherein said scanner and said media driver are moved at constant speeds during said modes of operation of said printer.

* * * * *